US006549981B2

(12) United States Patent
McDonald et al.

(10) Patent No.: US 6,549,981 B2
(45) Date of Patent: *Apr. 15, 2003

(54) DISK ARRAY SYSTEM WITH CONTROLLERS THAT AUTOMATE HOST SIDE OF ATA INTERFACE

(75) Inventors: James Arthur McDonald, Palo Alto, CA (US); John Peter Herz, Los Altos, CA (US); Mitchell Allen Altman, San Francisco, CA (US); William Edward Smith, III, Hayward, CA (US)

(73) Assignee: 3ware, Inc., Mountain View, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 10/142,562

(22) Filed: May 9, 2002

(65) Prior Publication Data

US 2002/0174297 A1 Nov. 21, 2002

Related U.S. Application Data

(63) Continuation of application No. 09/558,524, filed on Apr. 26, 2000, now Pat. No. 6,421,760, which is a continuation of application No. 09/034,247, filed on Mar. 4, 1998, now Pat. No. 6,134,630.
(60) Provisional application No. 60/065,848, filed on Nov. 14, 1997.

(51) Int. Cl.[7] ........................... G06F 12/00; G06F 13/00
(52) U.S. Cl. ....................................... 711/114; 711/112
(58) Field of Search ............................. 710/74; 711/114, 711/102, 104, 105, 111, 112; 714/6

(56) References Cited

U.S. PATENT DOCUMENTS

| 3,614,745 A | 10/1971 | Podvin et al. ............... 709/104 |
| 4,535,448 A | 8/1985 | Baxter et al. ................ 370/364 |
| 4,601,586 A | 7/1986 | Bahr et al. ................... 709/206 |
| 5,128,810 A | 7/1992 | Halford ........................ 360/39 |
| 5,206,943 A | 4/1993 | Callison et al. ............. 711/114 |
| 5,218,689 A | 6/1993 | Hotle .......................... 711/114 |
| 5,274,645 A | 12/1993 | Idleman et al. ................. 714/6 |
| 5,345,565 A | 9/1994 | Jibbe et al. .................. 710/316 |
| 5,412,661 A | 5/1995 | Hao et al. ....................... 714/6 |
| 5,426,736 A | 6/1995 | Guineau, III ................. 710/56 |
| 5,440,716 A | 8/1995 | Schultz et al. .............. 711/114 |
| 5,448,709 A | 9/1995 | Chandler et al. ............. 710/52 |
| 5,469,548 A | 11/1995 | Callison et al. ............. 711/114 |
| 5,479,611 A | 12/1995 | Oyama ......................... 714/48 |
| 5,479,653 A | 12/1995 | Jones ............................ 714/5 |
| 5,481,707 A | 1/1996 | Murphy, Jr. et al. ......... 709/102 |
| 5,499,385 A | 3/1996 | Farmwald et al. ............. 710/3 |
| 5,530,830 A | 6/1996 | Iwasaki et al. ............. 711/114 |
| 5,535,400 A | 7/1996 | Belmont ..................... 713/330 |
| 5,548,783 A | 8/1996 | Jones et al. .................. 710/16 |
| 5,550,986 A | 8/1996 | DuLac ........................ 710/100 |

(List continued on next page.)

*Primary Examiner*—Reginald G. Bragdon
*Assistant Examiner*—Pierre M. Vital
(74) *Attorney, Agent, or Firm*—Knobbe, Martens, Olson & Bear LLP

(57) ABSTRACT

A disk array system comprises a plurality of automated controllers, each of which implements a host side of a standard ATA interface protocol within automated circuitry to control a respective disk drive. Each automated controller preferably includes a command buffer for storing disk drive commands to be executed by a respective ATA drive, and a data buffer that stores I/O data being transferred to or from the ATA disk drive. In a preferred embodiment, the automated controllers are connected by a control bus to a microcontroller that dispatches disk drive commands to the automated controllers in response to I/O requests from a host computer, and are also connected by a second bus to an automated processor. The automated processor transfers I/O data between the automated controllers/ATA disk drives and a host computer, and tracks the completion statuses of pending I/O requests.

30 Claims, 9 Drawing Sheets

U.S. PATENT DOCUMENTS

| | | | |
|---|---|---|---|
| 5,574,662 A | 11/1996 | Windrem et al. | 709/219 |
| 5,586,248 A | 12/1996 | Alexander et al. | 714/22 |
| 5,592,648 A | 1/1997 | Schultz et al. | 711/114 |
| 5,619,728 A | 4/1997 | Jones et al. | 710/27 |
| 5,634,033 A | 5/1997 | Stewart et al. | 711/114 |
| 5,644,789 A | 7/1997 | Matthews et al. | 710/36 |
| 5,651,132 A | 7/1997 | Honda et al. | 711/114 |
| 5,657,468 A | 8/1997 | Stallmo et al. | 711/114 |
| 5,661,848 A * | 8/1997 | Bonke et al. | 360/48 |
| 5,664,096 A | 9/1997 | Ichinomiya et al. | 714/48 |
| 5,671,349 A * | 9/1997 | Hashemi et al. | 714/6 |
| 5,671,386 A | 9/1997 | Blair et al. | 711/5 |
| 5,675,736 A | 10/1997 | Brady et al. | 709/239 |
| 5,682,509 A | 10/1997 | Kabenjian | 710/312 |
| 5,687,389 A | 11/1997 | Packer | 710/5 |
| 5,701,450 A * | 12/1997 | Duncan | 710/36 |
| 5,721,839 A | 2/1998 | Callison et al. | 710/310 |
| 5,724,539 A | 3/1998 | Riggle et al. | 711/100 |
| 5,729,705 A | 3/1998 | Weber | 710/315 |
| 5,734,847 A | 3/1998 | Garbus et al. | 710/314 |
| 5,734,848 A | 3/1998 | Gates et al. | 710/315 |
| 5,737,744 A | 4/1998 | Callison et al. | 711/114 |
| 5,784,569 A * | 7/1998 | Miller et al. | 370/433 |
| 5,854,941 A | 12/1998 | Ballard et al. | 710/5 |
| 5,909,691 A | 6/1999 | Schultz et al. | 711/4 |
| 5,915,094 A | 6/1999 | Kouloheris et al. | 709/219 |
| 6,073,218 A | 6/2000 | DeKoning et al. | 711/150 |
| 6,157,962 A | 12/2000 | Hodges et al. | 710/1 |

* cited by examiner

TIME

DISK ARRAY SYSTEM WITH CONTROLLERS THAT AUTOMATE HOST SIDE OF ATA INTERFACE

PRIORITY CLAIM

This application is a continuation of U.S. patent application Ser. No. 09/558,524, filed Apr. 26, 2000, (now U.S. Pat. No. 6,421,760) which is a continuation of U.S. patent application Ser. No. 09/034,247, filed Mar. 4, 1998 (now U.S. Pat. No. 6,134,630), which claims the benefit of U.S. Provisional Appl. No. 60/065,848, filed Nov. 14, 1997.

FIELD OF THE INVENTION

The present invention relates to disk arrays, and more particularly, relates to hardware and software architectures for hardware-implemented RAID (Redundant Array of Inexpensive Disks) and other disk array systems.

BACKGROUND OF THE INVENTION

A RAID system is a computer data storage system in which data is spread or "striped" across multiple disk drives. In many implementations, the data is stored in conjunction with parity information such that any data lost as the result of a single disk drive failure can be automatically reconstructed.

One simple type of RAID implementation is known as "software RAID." With software RAID, software (typically part of the operating system) which runs on the host computer is used to implement the various RAID control functions. These control functions include, for example, generating drive-specific read/write requests according to a striping algorithm, reconstructing lost data when drive failures occur, and generating and checking parity. Because these tasks occupy CPU bandwidth, and because the transfer of parity information occupies bandwidth on the system bus, software RAID frequently produces a degradation in performance over single disk drive systems.

Where performance is a concern, a "hardware-implemented RAID" system may be used. With hardware-implemented RAID, the RAID control functions are handled by a dedicated array controller (typically a card) which presents the array to the host computer as a single, composite disk drive. Because little or no host CPU bandwidth is used to perform the RAID control functions, and because no RAID parity traffic flows across the system bus, little or no degradation in performance occurs.

One potential benefit of RAID systems is that the input/output ("I/O") data can be transferred to and from multiple disk drives in parallel. By exploiting this parallelism (particularly within a hardware-implemented RAID system), it is possible to achieve a higher degree of performance than is possible with a single disk drive. The two basic types of performance that can potentially be increased are the number of I/O requests processed per second ("transactional performance") and the number of megabytes of I/O data transferred per second ("streaming performance").

Unfortunately, few hardware-implemented RAID systems provide an appreciable increase in performance. In many cases, this failure to provide a performance improvement is the result of limitations in the array controller's bus architecture. Performance can also be adversely affected by frequent interrupts of the host computer's processor.

In addition, attempts to increase performance have often relied on the use of expensive hardware components. For example, some RAID array controllers rely on the use of a relatively expensive microcontroller that can process I/O data at a high transfer rate. Other designs rely on complex disk drive interfaces, and thus require the use of expensive disk drives.

The present invention addresses these and other limitations in existing RAID architectures.

SUMMARY OF THE INVENTION

One particular embodiment of the invention is a disk array controller that controls a plurality of ATA disk drives. The disk array controller comprises a plurality of automated controllers, each of which implements a host side of a standard ATA interface protocol within automated circuitry to control a respective ATA disk drive. The automated controllers are connected by a control bus to a microcontroller that dispatches disk drive commands to the automated controllers in response to I/O requests from a host computer. The microcontroller is preferably programmed to support one or more RAID configurations. The automated controllers are also connected by a second bus to an automated processor. The automated processor transfers I/O data between the automated controllers/ATA disk drives and the host computer, and tracks the completion statuses of pending I/O requests.

Each automated controller preferably includes a command buffer for storing disk drive commands to be executed by a respective ATA drive, and a data buffer that stores I/O data being transferred to or from the ATA disk drive. By automating the host side of the ATA protocol, the present invention provides a high degree of I/O performance, particularly in the context of RAID and other disk array systems. The automated controller may, for example, be embodied within an ASIC or FPGA device.

One aspect of the invention is thus a disk array controller comprising a plurality of controllers, each controller automating a host side of an ATA protocol to control a respective disk drive of a plurality of disk drives. The disk array controller further comprises a processor that processes input/output data written to and read from the disk drives; and a bus that interconnects, and carries input/output data between, the processor and each of the plurality of controllers. The disk array controller may also include a microcontroller that dispatches disk drive commands to the controllers over a control bus that is separate from the bus used to transfer input/output data.

Another aspect of the invention is an input/output subsystem comprising an ATA (AT Attachment) disk drive, and a controller external to the ATA disk drive and connected to the ATA disk drive by a set of signal lines. The controller implements a host side of an ATA protocol within automated circuitry to control the ATA disk drive over the set of signal lines. The controller preferably includes a command buffer that buffers disk drive commands to be executed by a respective ATA drive, and a data buffer that stores I/O data being transferred to and from the ATA disk drive.

BRIEF DESCRIPTION OF THE DRAWINGS

There and other features of the architecture will now be described in further detail with reference to the drawings of the preferred embodiment, in which.

DETAILED DESCRIPTION OF THE PREFERRED EMBODIMENT

I. Existing RAID Architectures

Figure 1:
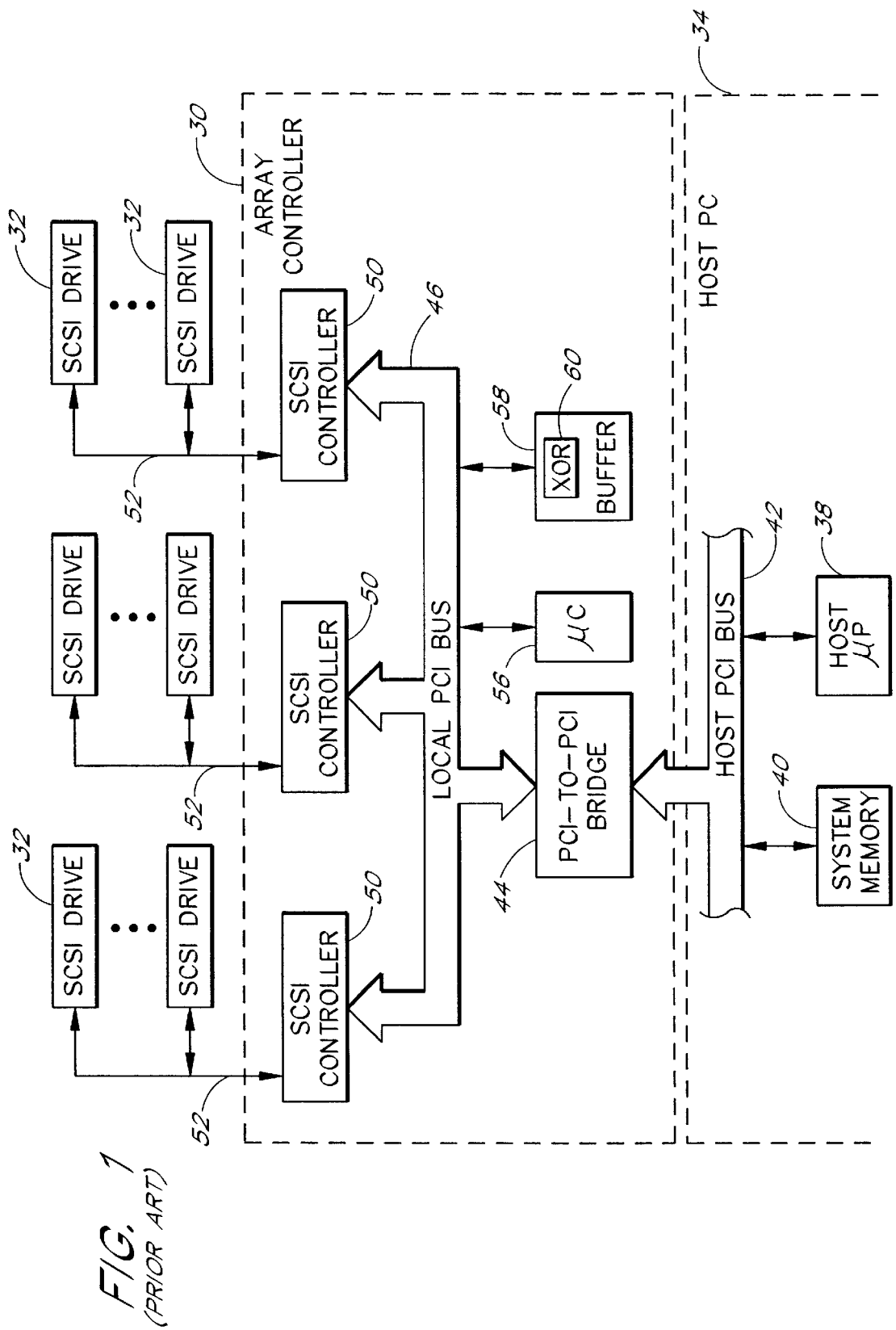
FIG. 1 illustrates a prior art disk array architecture.

To illustrate several of the motivations behind the present invention, a prevalent prior art architecture used within existing PC-based RAID systems will initially be described with reference to FIG. 1. As depicted in FIG. 1, the architecture includes an array controller card 30 ("array controller") that couples an array of SCSI (Small Computer Systems Interface) disk drives 32 to a host computer (PC) 34. The array controller 30 plugs into a PCI (Peripheral Component Interconnect) expansion slot of the host computer 34, and communicates with a host processor 38 and a system memory 40 via a host PCI bus 42. For purposes of this description and the description of the preferred embodiment, it may be assumed that the host processor 38 is an Intel Pentium™ or other X86-compatible microprocessor, and that the host computer 34 is operating under either the Windows™ 95 or the Windows™ NT operating system.

The array controller 30 includes a PCI-to-PCI bridge 44 which couples the host PCI bus 42 to a local PCI bus 46 of the controller 30, and which acts as a bus master with respect to both busses 42, 46. Two or more SCSI controllers 50 (three shown in FIG. 1) are connected to the local PCI bus 46. Each SCSI controller 50 controls the operation of two or more SCSI disk drives 32 via a respective shared cable 52. The array controller 30 also includes a microcontroller 56 and a buffer 58, both of which are coupled to the local PCI bus by appropriate bridge devices (not shown). The buffer 58 will typically include appropriate exclusive-OR (XOR) logic 60 for performing the XOR operations associated with RAID storage protocols.

In operation, the host processor 38 (running under the control of a device driver) sends input/output (I/O) requests to the microcontroller 56 via the host PCI bus 42, the PCI-to-PCI bridge 44, and the local PCI bus 46. Each I/O request typically consists of a command descriptor block (CDB) and a scatter-gather list. The CDB is a SCSI drive command that specifies such parameters as the disk operation to be performed (e.g., read or write), a disk drive logical block address, and a transfer length. The scatter-gather list is an address list of one of more contiguous blocks of system memory for performing the I/O operation.

The microcontroller 56 runs a firmware program which translates these I/O requests into component, disk-specific SCSI commands based on a particular RAID configuration (such as RAID 4 or RAID 5), and dispatches these commands to corresponding SCSI controllers 50. For example, if, based on the particular RAID configuration implemented by the system, a given I/O request requires data to be read from every SCSI drive 32 of the array, the microcontroller 56 sends SCSI commands to each of the SCSI controllers 50. The SCSI controllers in-turn arbitrate for control of the local PCI bus 46 to transfer I/O data between the SCSI disks 32 and system memory 40. I/O data that is being transferred from system memory 40 to the disk drives 32 is initially stored in the buffer 58. The buffer 58 is also typically used to perform XOR operations, rebuild operations (in response to disk failures), and other operations associated with the particular RAID configuration. The microcontroller 56 also monitors the processing of the dispatched SCSI commands, and interrupts the host processor 38 to notify the device driver of completed transfer operations.

The FIG. 1 architecture suffers from several deficiencies that are addressed by the present invention. One such deficiency is that the SCSI drives 32 are expensive in comparison to ATA (AT Attachment) drives. While it is possible to replace the SCSI drives with less expensive ATA drives (see, for example, U.S. Pat. No. 5,506,977), the use of ATA drives would generally result in a decrease in performance. One reason for the decreased performance is that ATA drives do not buffer multiple disk commands; thus each ATA drive would normally remain inactive while a new command is being retrieved from the microcontroller 56. One goal of the present invention is thus to provide an architecture in which ATA and other low-cost drives can be used while maintaining a high level of performance.

Another problem with the FIG. 1 architecture is that the local PCI bus and the shared cables 52 are susceptible to being dominated by a single disk drive 32. Such dominance can result in increased transactional latency, and a corresponding degradation in performance. A related problem is that the local PCI bus 46 is used both for the transfer of commands and the transfer of I/O data; increased command traffic on the bus 46 can therefore adversely affect the throughput and latency of data traffic. As described below, the architecture of the preferred embodiment overcomes these and other problems by using separate control and data busses, and by using a round-robin arbitration protocol to grant the local data bus to individual drives.

Another problem with the prior art architecture is that because the microcontroller 56 has to monitor the component I/O transfers that are performed as part of each I/O request, a high-performance microcontroller generally must be used. As described below, the architecture of the preferred embodiment avoids this problem by shifting the completion monitoring task to a separate, non-program-controlled device that handles the task of routing I/O data, and by embedding special completion data values within the I/O data stream to enable such monitoring. This effectively removes the microcontroller from the I/O data path, enabling the use of a lower cost, lower performance microcontroller.

Another problem, in at least some RAID implementations, is that the microcontroller 56 interrupts the host processor 38 multiple times during the processing of a single I/O request. For example, it is common for the microcontroller 56 to interrupt the host processor 38 at least once for each contiguous block of system memory referenced by the scatter-gather list. Because there is significant overhead associated with the processing of an interrupt, the processing of the interrupts significantly detracts from the processor bandwidth that is available for handling other types of tasks. It is therefore an object of the present invention to provide an architecture in which the array controller interrupts the host processor no more than once per I/O request.

A related problem, in many RAID architectures, is that when the array controller 30 generates an interrupt request to the host processor 38, the array controller suspends operation, or at least postpones generating the following interrupt request, until after the pending interrupt request has been serviced. This creates a potential bottleneck in the flow of I/O data, and increases the number of interrupt requests that need to be serviced by the host processor 56. It is therefore an object of the invention to provide an architecture in which the array controller continues to process subsequent I/O requests while an interrupt request is pending, so that the device driver can process multiple completed I/O requests when the host processor eventually services an interrupt request.

The present invention provides a high performance disk array architecture which addresses these and other problems with prior art RAID systems. An important aspect of the invention is that the primary performance benefits provided by the architecture are not tied to a particular type of disk drive interface. Thus, the architecture can be implemented using ATA drives (as in the preferred embodiment described below) and other types of relatively low-cost drives while providing a high level of performance.

II. System Overview

A disk array system which embodies the various features of the present invention will now be described with reference to the remaining drawings. Throughout this description, reference will be made to various implementation-specific details, including, for example, part numbers, industry standards, timing parameters, message formats, and widths of data paths. These details are provided in order to fully set forth a preferred embodiment of the invention, and not to limit the scope of the invention. The scope of the invention is set forth in the appended claims.

Figure 2:
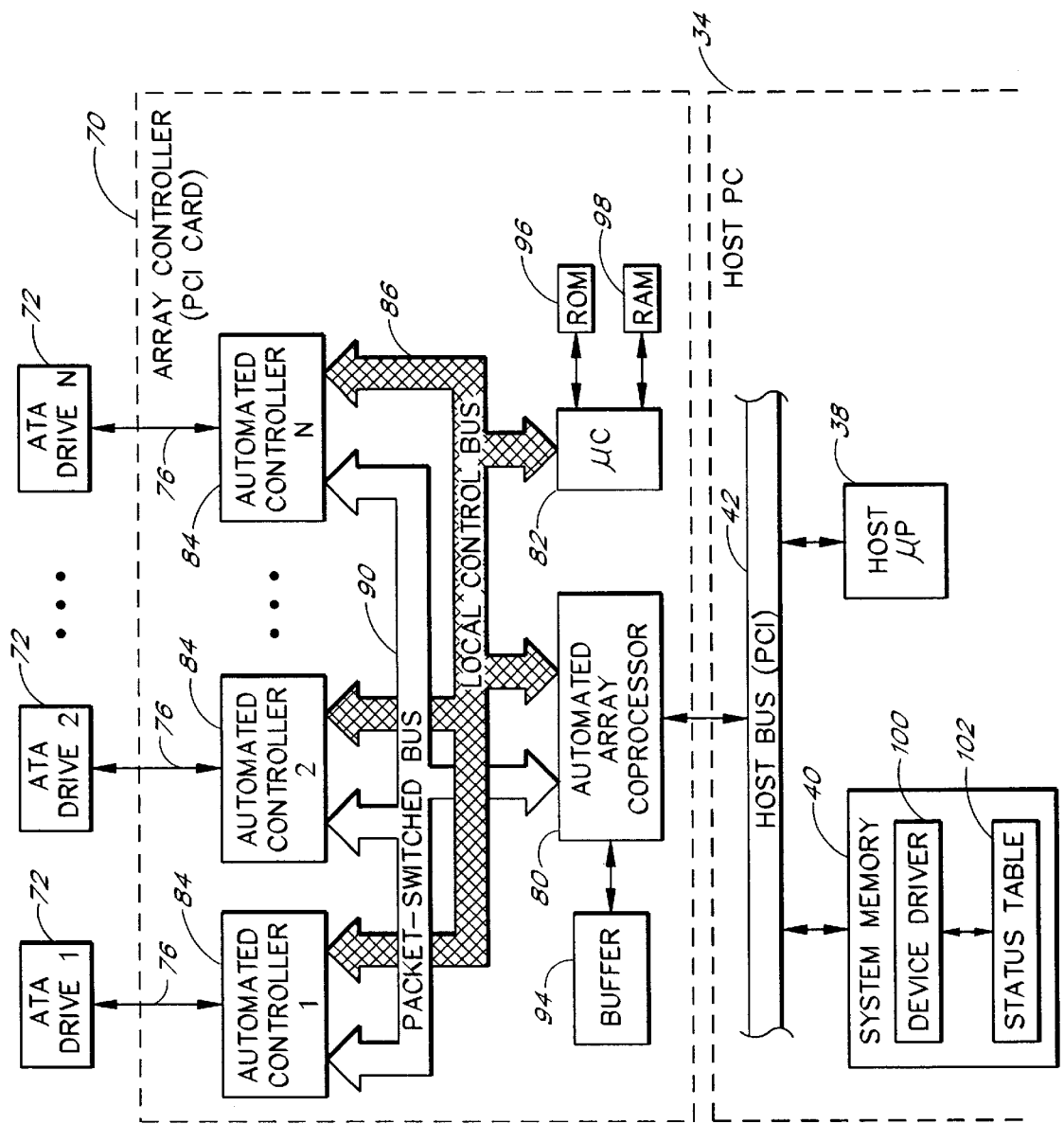
FIG. 2 illustrates a disk array system in accordance with a preferred embodiment of the present invention.

As depicted in FIG. 2, the disk array system comprises an array controller card 70 ("array controller") that plugs into a PCI slot of the host computer 34. The array controller 70 links the host computer to an array of ATA disk drives 72 (numbered 1–N in FIG. 2), with each drive connected to the array controller by a respective ATA cable 76. In one implementation, the array controller 70 includes eight ATA ports to permit the connection of up to eight ATA drives. The use of a separate port per drive 72 enables the drives to be tightly controlled by the array controller 70, as is desirable for achieving a high level of performance. In the preferred embodiment, the array controller 70 supports both the ATA mode 4 standard (also known as Enhanced IDE) and the Ultra ATA standard (also known as Ultra DMA), permitting the use of both types of drives.

As described below, the ability to use less expensive ATA drives, while maintaining a high level of performance, is an important feature of the invention. It will be recognized, however, that many of the architectural features of the invention can be used to increase the performance of disk array systems that use other types of drives, including SCSI drives. It will also be recognized that the disclosed array controller 70 can be adapted for use with other types of disk drives (including CD-ROM and DVD drives) and mass storage devices (including FLASH and other solid state memory drives).

In the preferred embodiment, the array of ATA drives 72 is operated as a RAID array using, for example, a RAID 4 or a RAID 5 configuration. The array controller 70 can alternatively be configured through firmware to operate the drives using a non-RAID implementation, such as a JBOD (Just a Bunch of Disks) configuration.

With further reference to FIG. 2, the array controller 70 includes an automated array coprocessor 80, a microcontroller 82, and an array of automated controllers 84 (one per ATA drive 72), all of which are interconnected by a local control bus 86 that is used to transfer command and other control information. (As used herein, the term "automated" refers to a data processing unit which operates without fetching and executing sequences of macro-instructions.) The automated controllers 84 are also connected to the array coprocessor 80 by a packet-switched bus 90. As further depicted in FIG. 2, the array coprocessor 80 is locally connected to a buffer 94, and the microcontroller 82 is locally connected to a read-only memory (ROM) 96 and a random-access memory (RAM) 98.

The packet-switched bus 90 handles all I/O data transfers between the automated controllers 84 and the array coprocessor 80. All transfers on the packet-switched bus 90 flow either to or from the array coprocessor 80, and all accesses to the packet-switched bus are controlled by the array coprocessor. These aspects of the bus architecture provide for a high degree of data flow performance without the complexity typically associated with PCI and other peer-to-peer type bus architectures.

As described below, the packet-switched bus 90 uses a packet-based round robin protocol that guarantees that at least 1/N of the bus's I/O bandwidth will be available to each drive during each round robin cycle (and thus throughout the course of each I/O transfer). Because this amount (1/N) of bandwidth is equal to or exceeds the sustained data transfer rate of each ATA drive 72 (which is typically in the range of 10 Mbytes/sec.), all N drives can operate concurrently at the sustained data rate without the formation of a bottleneck. For example, in an 8-drive configuration, all 8 drives can continuously stream 10 Mbytes/second of data to their respective automated controllers 84, in which case the packet-switched bus 90 will transfer the I/O data to the array coprocessor at a rate of 80 Mbytes/second. When less than N drives are using the packet-switched bus 90, each drive is allocated more than 1/N of the bus's bandwidth, allowing each drive to transfer data at a rate which exceeds the sustained data transfer rate (such as when the requested I/O data resides in the disk drive's cache).

In the preferred embodiment, the array coprocessor 80 is implemented using an FPGA, such as a Xilinx 4000-series FPGA. An application-specific integrated circuit (ASIC) or other type of device may alternatively be used. The general functions performed by the array coprocessor 80 include the following: (i) forwarding I/O requests from the host processor 38 to the microcontroller 82, (ii) controlling arbitration on the packet-switched bus 90, (iii) routing I/O data between the automated controllers 84, the system memory 40, and the buffer 94, (iv) performing exclusive-OR, read-modify-write, and other RAID-related logic operations involving I/O data using the buffer 94; and (v) monitoring and reporting the completion status of I/O requests. With respect to the PCI bus 42 of the host computer 34, the array coprocessor 80 acts as a PCI initiator (a type of PCI bus master) which initiates memory read and write operations based on commands received from the automated controllers 84. The operation of the array coprocessor 80 is further described below.

The buffer 94 is preferably either a 1 megabyte (MB) or 4 MB volatile, random access memory. Synchronous DRAM or synchronous SRAM may be used for this purpose. All data that is written from the host computer 34 to the disk array is initially written to this buffer 94. In addition, the array coprocessor 80 uses this buffer 94 for volume rebuilding (such as when a drive or a drive sector goes bad) and parity generation. Although the buffer 94 is external to the array coprocessor in the preferred embodiment, it may alternatively be integrated into the same chip.

The microcontroller 82 used in the preferred embodiment is a Siemens 163. The microcontroller 82 is controlled by a firmware control program (stored in the ROM 96) that implements a particular RAID or non-RAID storage protocol. The primary function performed by the microcontroller is to translate I/O requests from the host computer 34 into sequences of disk-specific controller commands, and to dispatch these commands over the local control bus 86 to specific automated controllers 84 for processing. As described below, the architecture is such that the microcontroller 82 does not have to directly monitor the I/O transfers that result from the dispatched controller commands, as this task is allocated to the array coprocessor 80 (using an efficient completion token scheme which is described below). This aspect of the architecture enables a relatively low cost, low performance microcontroller to be used, and reduces the complexity of the control program.

Although the microcontroller 82 is a separate device in the preferred embodiment, the microcontroller could alternatively be integrated into the same device as the array coprocessor 80. This could be done, for example, by purchasing Siemens 163 core (or the core of a comparable microcontroller), and embedding the core within an ASIC that includes the array coprocessor logic.

The control program also includes code for initiating volume rebuilds in response to drive failures, and for handling other types of error conditions. The particular settings (RAID configuration, rebuild options, etc.) implemented by the control program are stored within a profile table (not shown) in the local RAM 98, and can be modified by a system administrator using a utility program that runs on the host computer 34.

The automated controllers 84 are implemented in the preferred embodiment using Xilinx FPGA devices, with two automated controllers implemented within each FPGA chip. ASICs could alternatively be used. The automated controllers 84 operate generally by communicating with their respective drives 72 based on commands (referred to herein as "controller commands") received from the microcontroller 82, and by communicating with the array coprocessor 80 over the packet-switched bus to transfer I/O data. As discussed below, the automated controllers 84 implement a command buffer to avoid the latency normally associated with having to request and wait for the next disk command.

As further depicted by FIG. 2, the system includes a device driver 100 which is executed by the host processor 38 to enable the operating system to communicate with the array controller 70. In the preferred embodiment, the device driver 100 is implemented as a SCSI Miniport driver that runs under the Microsoft Windows 95 or NT operating system. The driver 100 presents the drive array to the host computer 34 as a SCSI device, which in-turn enables the array controller 70 to queue up and process multiple I/O requests at-a-time. A kernel mode disk device driver which may alternatively be used, in which case the I/O requests passed to the device driver by the operating system will be in the form of Windows I/O request packets (IRPs). As shown in FIG. 2, the device driver maintains and accesses an I/O request status table 102 in system memory. As described below, the array coprocessor 80 updates this table 102 (in response to special completion packets received from the automated controllers 84) to notify the driver 100 of the completion of pending I/O requests.

Figure 3:
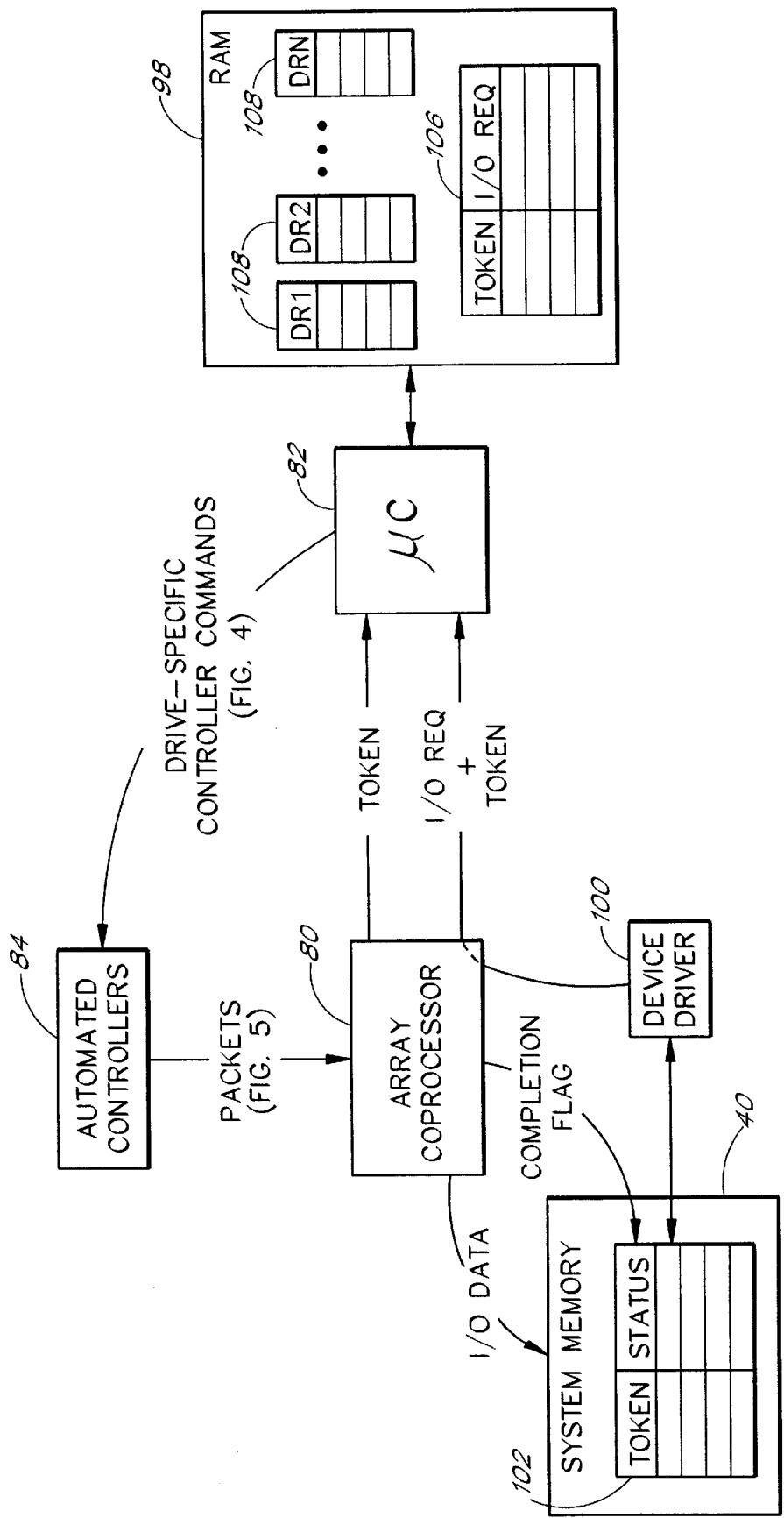
FIG. 3 illustrates the general flow of information between the primary components of the FIG. 2 system.

FIG. 3 illustrates the general flow of information between the components of the disk-array system during a typical I/O operation, and will be used to describe the general operation of the system (including a technique for monitoring the completion status of pending I/O requests). To simplify the drawing, the disk drives 72 and buffer 94 are omitted from the figure, and the automated controllers 84 are shown as a single entity. Throughout the description which follows, it is assumed that the number of drives N is 8. In addition, the operation of the system is described as if only a single I/O request is being processed, although multiple I/O requests will typically be processed concurrently.

In operation, when the device driver 100 receives an I/O request from the operating system (not shown), the device driver assigns to the I/O request an identification number referred to as a completion token ("token"). In the preferred embodiment, the tokens are 4-bit values that are recycled (reused) as I/O requests are completed. As depicted in FIG. 3, the device driver 100 passes the I/O request (in the general form of a CDB plus a scatter-gather list) and the token to the microcontroller 82 for processing. In addition, the device driver 100 records the token in the I/O request status table 102 to maintain a record of the pending I/O request. This may be accomplished, for example, by setting appropriate status flags associated with the token value.

Because the array controller 70 can process multiple I/O requests at-a-time, multiple I/O requests may be recorded within the status table 102 at any given time. As described below, the array coprocessor 80 automatically updates the status table 102 whenever an I/O request is completed, and the device driver 100 monitors the status table 102 to detect the completion of the pending I/O requests. In the preferred embodiment, the I/O requests may be completed by the array controller 70 in an order that is different from the order in which the I/O requests are passed to the array controller 70.

As further illustrated by FIG. 3, the microcontroller 82 records the I/O request and the token within a "pending I/O request" table 106 within its local RAM 98. In addition, the microcontroller 82 translates the I/O request into one or more drive-specific sequences of commands, referred to herein as "controller commands." For example, if, based on the particular RAID configuration (e.g., RAID 5) implemented by the control program, the I/O request calls for data to be read from or written to drives 1, 2 and 8, the microcontroller will generate three sequences of controller commands, one for each of the three drives. The number of controller commands per drive-specific sequence will generally depend upon the CDB, the RAID configuration, and the number of entries within the scatter-gather list.

The microcontroller 82 stores these sequences of controller commands in drive-specific queues 108 within the RAM 98, and dispatches the controller commands in sequential order (over the local control bus 86) to the corresponding automated controllers 84. For example, if the I/O request invokes drives 1, 2 and 8, controller command sequences will be written to the respective queues 108 for drives 1, 2 and 8, and the individual controller commands with thereafter be sequentially dispatched from these queues to automated controllers 1, 2 and 8 respectively. A queue 108 may contain controller commands associated with different I/O requests at the same time.

As described below, a special completion monitoring circuit monitors the processing of the command sequences by the automated controllers 84 that are invoked by the I/O request, and notifies the microcontroller 82 when all of the invoked automated controllers 84 have finished processing their respective command sequences. This eliminates the need for the microcontroller 82 to monitor the processing of the individual command sequences.

Figure 4:
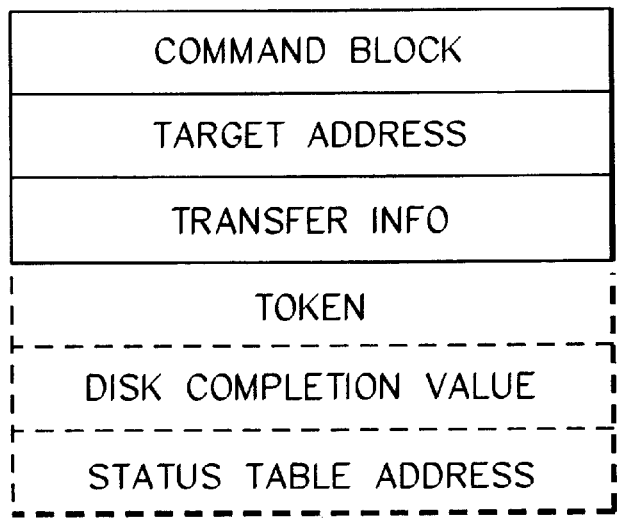
FIG. 4 illustrates the types of information included within the controller commands.

As depicted in FIG. 4, each controller command includes a command block, a target address, and transfer information. The command block specifies a disk operation, such as a read of a particular sector. The target address references a contiguous area in either the system memory 40 or the buffer 94 (FIG. 2) for performing an I/O transfer. The transfer information specifies the details of the transfer operation, such as whether the operation will involve an exclusive-OR of data stored in the buffer 94 (FIG. 2).

As depicted by the dashed line portion in FIG. 4, the last controller command of each sequence additionally includes the token value that was assigned to the I/O request, a disk-specific completion value ("disk completion value"), and the system memory address of the status table 102 (FIG. 3). These data items may alternatively be transferred to the automated controller as a separate controller command. The disk completion values are generated by the microcontroller 82 such that, when all of the disk completion values assigned to the I/O request are ORed together, the result is a preselected "final completion value" (FFH in the preferred embodiment) that is known to the array coprocessor 80. For example, if drives 1, 2 and 8 are invoked, then the following disk completion values can be used to produce a final value of FFH:

Drive 1: 01H (00000001B)

Drive 2: 02H (00000010B)

Drive 8: FCH (11111100B)

As described below, the automated controllers 84 transmit the token and their respective completion values to the array coprocessor 80 as the automated controllers 84 finish their respective portions of the I/O request (i.e., finish processing their respective controller command sequences), and the array coprocessor cumulatively ORs the disk completion values together as they are received to detect the completion of the I/O request. This method enables the array coprocessor 80 to efficiently identify the completion of an I/O request without prior knowledge of the processing details (number of disk drives involved, identities of invoked disk drives, etc.) of the I/O request.

With further reference to FIG. 3, the automated controllers 84 process the controller commands by communicating with their respective disk drives 72 (FIG. 2), and by sending packets to the array coprocessor 80 over the packet-switched bus 90. In the example above (drives 1, 2 and 8 invoked), the I/O request would thus result in packets flowing from automated controllers 1, 2 and 8 to the array coprocessor 80. Each controller command spawns the transmission of a sequence of packets (e.g., 16 packets) from the corresponding automated controller 84. (As used herein, the term "packet" refers generally to a block of binary data that includes address and control information.)

Figure 5:
FIG. 5 illustrates a format used for the transmission of packets.

As illustrated in FIG. 5, each packet includes a transfer command, a target address, and an optional payload (depending upon the type of the packet and the availability of I/O data). The transfer command specifies an operation to be performed by the array coprocessor 80. For example, a packet might include a READ PCI transfer command that instructs the array coprocessor 80 to copy a block of data from a specified system memory address and to a specified buffer address 94. For all packets other than completion packets (discussed below), the transfer command is derived by the automated controller 84 from the transfer information (FIG. 4) included within the controller command. The target address specifies a target location, in either the buffer 94 (FIG. 2) or the system memory 40 (FIG. 2), to which data is to be transferred or from which data is to be read.

The transfer commands that are supported by the system are listed and summarized in Table 1. As illustrated by Table 1, if the transfer command is WRITE BUFFER, XOR BUFFER or WRITE PCI, the payload includes disk data that has been read from the corresponding disk drive. In the example flow shown in FIG. 3, the I/O data is depicted as flowing from the array coprocessor 80 to system memory 40, as would be the case when a WRITE PCI command is executed.

If, on the other hand, the transfer command is READ BUFFER, the automated controller 84 transmits the command and the target address, and the array coprocessor 80 then "fills in" the payload portion with the buffer data to be transferred to the disk drive. Thus, although all packets logically flow from the automated controllers 84 to the array coprocessor 80, the packet-switched 90 bus is actually a bi-directional bus that transfers I/O data in both directions (i.e., from the automated controllers 84 to the array coprocessor 80 and vice versa). The timing associated with packet transfers is discussed separately below.

TABLE 1

| TRANSFER COMMAND | TARGET ADDRESS | DESCRIPTION |
|---|---|---|
| READ BUFFER | Buffer Address | Read data from buffer and transfer to automated controller. Payload = 8 Dwords of buffer data. |
| WRITE BUFFER | Buffer Address | Write disk data to buffer. Payload = 8 Dwords of data read from disk. |
| XOR BUFFER | Buffer Address | Exclusive OR buffer data with payload data and overwrite in buffer. Payload = 8 Dwords of data read from disk. |
| WRITE PCI | PCI Address | Write payload data to system memory. Payload = 8 Dwords of data read from disk. |
| READ PCI | Buffer Address | Read data from system memory and write to buffer. Payload = PCI address for performing read. |
| WRITE PCI COMPLETE | PCI Address of Status Table | Update internally-stored completion table using token and disk completion value included within command field. If I/O request is complete, send token to microcontroller, and use PCI address and token to update status table. No payload. |

As shown in Table 1, packets that carry I/O data have a payload length of 8 doublewords (Dwords), where one doubleword=32 bits. Thus, 16 packets are needed to move one sector (512 bytes) of I/O data.

In general, the drives invoked by an I/O request process their respective portions (transfers) of the request asynchronously to one another, and can finish their respective portions in any order. In addition, once a drive/automated controller pair finishes processing the I/O request, the pair can immediately begin processing the next I/O request, even though other drives may still be working on the current I/O request.

Whenever an automated controller 84 finishes processing the last controller command of a sequence of controller commands—indicating that the automated controller has finished its respective portion of the I/O request—the automated controller generates a special packet (referred to as a "completion packet") which includes the WRITE PCI COMPLETE command (Table 1). An I/O request can produce as few as one completion packet (if only one drive is invoked) and as many as eight completion packets (if all eight drives are invoked), and the completion packets can arrive at the array coprocessor 80 in any order. Each completion packet includes the token, the disk completion value, and the status table (PCI) address that are appended to the last controller command (FIG. 4) of the sequence. The token and disk completion value are included within the packet's command field, and the status table address is included within the address field.

Figure 8:
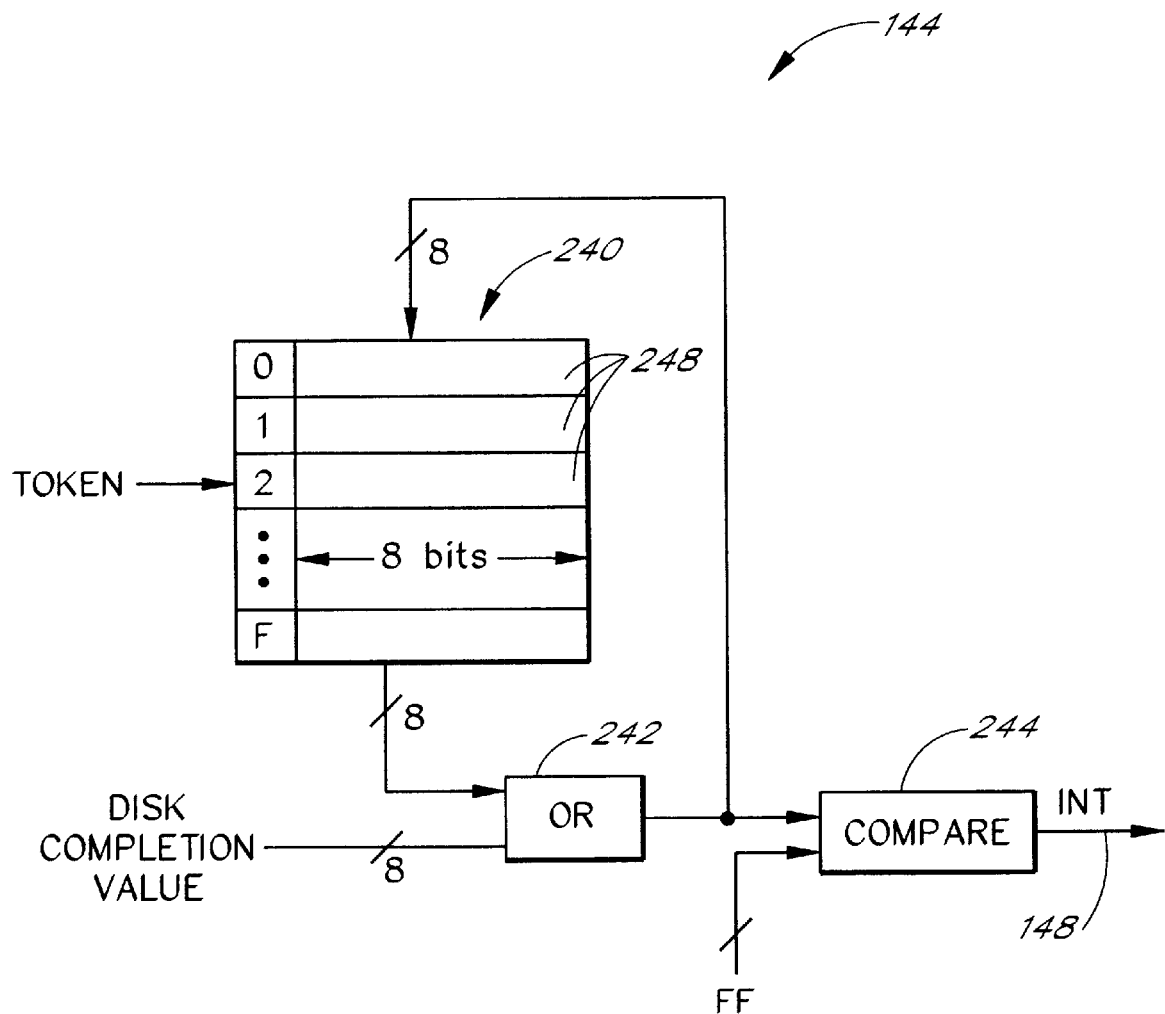
FIG. 8 illustrates the completion logic circuit of FIG. 6 in further detail.

As the completion packets associated with the I/O request (token) are received, the array coprocessor 80 cumulatively ORs the completion values together to determine whether any other disk drives are still working on the I/O request. The logic circuit used to perform this task is shown in FIG. 8 and is discussed separately below. With the exception of the last completion packet of an I/O request, the array coprocessor 80 does not take any external action in response to receiving the completion packets.

As further illustrated by FIG. 3, once the result of the cumulative OR operation equals the final completion value (indicating that the last completion packet has been received, and that all drives have finished processing the I/O request), the array coprocessor 80 performs two basic tasks. The first task is to interrupt the microcontroller 82 and transmit the token (over the local control bus 86) to the microcontroller 82. The microcontroller 82 responds to the interrupt by removing the I/O request from the "pending I/O request" table 106 to reflect that the request has been completed. In general, if a pending I/O request is not removed from the table 106 within a certain timeout period, the microcontroller 82 invokes an error processing routine to process the timeout error.

The second task performed by the array coprocessor 80 is to update a status entry in the status table 102 to indicate to the device driver 100 that processing of the I/O request is complete, and then set an interrupt flag (if not already set) to the host processor 38 to generate an interrupt request. The update to the status table 102 may be made, for example, by using the PCI address (included within the completion packet) as a base address which points to the status table, and using the token value as an offset into the table. As depicted in FIG. 3, a completion flag associated with the token (I/O request) may then be set. Because only the last completion packet produces an update to the status table 102, the status table address may alternatively be omitted from all but one of the completion packets for the I/O request, in which case the array coprocessor 80 may be configured to buffer the address (in association with the corresponding token) until it is needed.

In another embodiment of the invention, the completion packets include a payload that carries a pointer that is meaningful to device driver 100, and the array coprocessor 80 writes this pointer to the status table 102 when the last completion packet is received. The pointer is preferably a value which identifies the I/O request to the device driver 100 or the operating system. For example, the pointer may be an identifier or system memory address of a SCSI request block (SRB) or an I/O request packet (IRP). The advantage of this alternative implementation is that it eliminates the need for the device driver 100 to use a separate lookup table to match the token number to the pending I/O request. As with the tokens, the pointer values are preferably passed to the microcontroller 82 by the device driver 100 (with the I/O requests) and embedded within the last controller command of each drive-specific sequence. The pointer values may also serve as the tokens themselves, in which case separate token values may be omitted.

While the interrupt request to the host processor 38 is pending, the array controller 70 continues to process pending I/O requests, and continues to update the status table 102 as additional I/O requests are completed. When the host processor 38 eventually processes the interrupt request, the device driver 100 accesses the status table 102 to determine which of the pending I/O requests have been completed. When the device driver 100 determines that a given I/O request has been completed, the device driver notifies the operating system of such, and removes the I/O request from the status table 102. This feature of the architecture (i.e., the ability to process multiple I/O requests per interrupt) significantly improves the performance of the host computer 34 by reducing the frequency at which the host processor 38 is interrupted. To take advantage of this feature, the device driver 100 is preferably configured to make use of deferred procedure calls to defer the processing of the interrupts.

As will be apparent from the foregoing, an important benefit of the present architecture is that the microcontroller 82 does not have to monitor the constituent disk operations of the I/O request to ensure that each completes successfully. A related benefit, which is described further below, is that the array coprocessor 80 does not require logic for correlating the constituent disk operations to the pending I/O requests. Both of these features are enabled in-part by the use of tokens and completion values to track the completion of I/O requests.

Another benefit of the architecture is that the microcontroller 82 is effectively removed from the I/O data path. This reduces the complexity of the control program, and enables a less expensive microcontroller to be used. Another benefit is that the flow of command information to the automated controllers 84 does not interfere with the flow of I/O data, since separate busses are used for the two.

It will be appreciated that the above-described method for monitoring the completion of I/O requests can also be used in a disk array system in which each disk controller 84 controls multiple disk drives. Each disk controller 84 that is invoked by the I/O request would still be assigned a unique disk completion value, but this value would be passed to the array coprocessor 80 only after all of the invoked disk drives controlled by that controller have finished processing the I/O request. It will also be recognized that the I/O requests that are tracked using the above-described technique need not correspond identically to the I/O requests generated by the operating system. For example, the device driver could be configured to combine multiple I/O requests together for processing, and the above-described method could be used to detect the completion of these combined I/O requests.

III. Local Bus Signals of Array Controller

The primary interconnections between the components of the array controller 70 will now be described with reference to FIG. 6, which shows the array coprocessor 80, the microcontroller 82, and a single automated controller 84. Throughout FIG. 6, the abbreviation "AC" is used to refer to the automated controllers, and subscripts are used to denote correspondence with drives 1–8.

Figure 6:
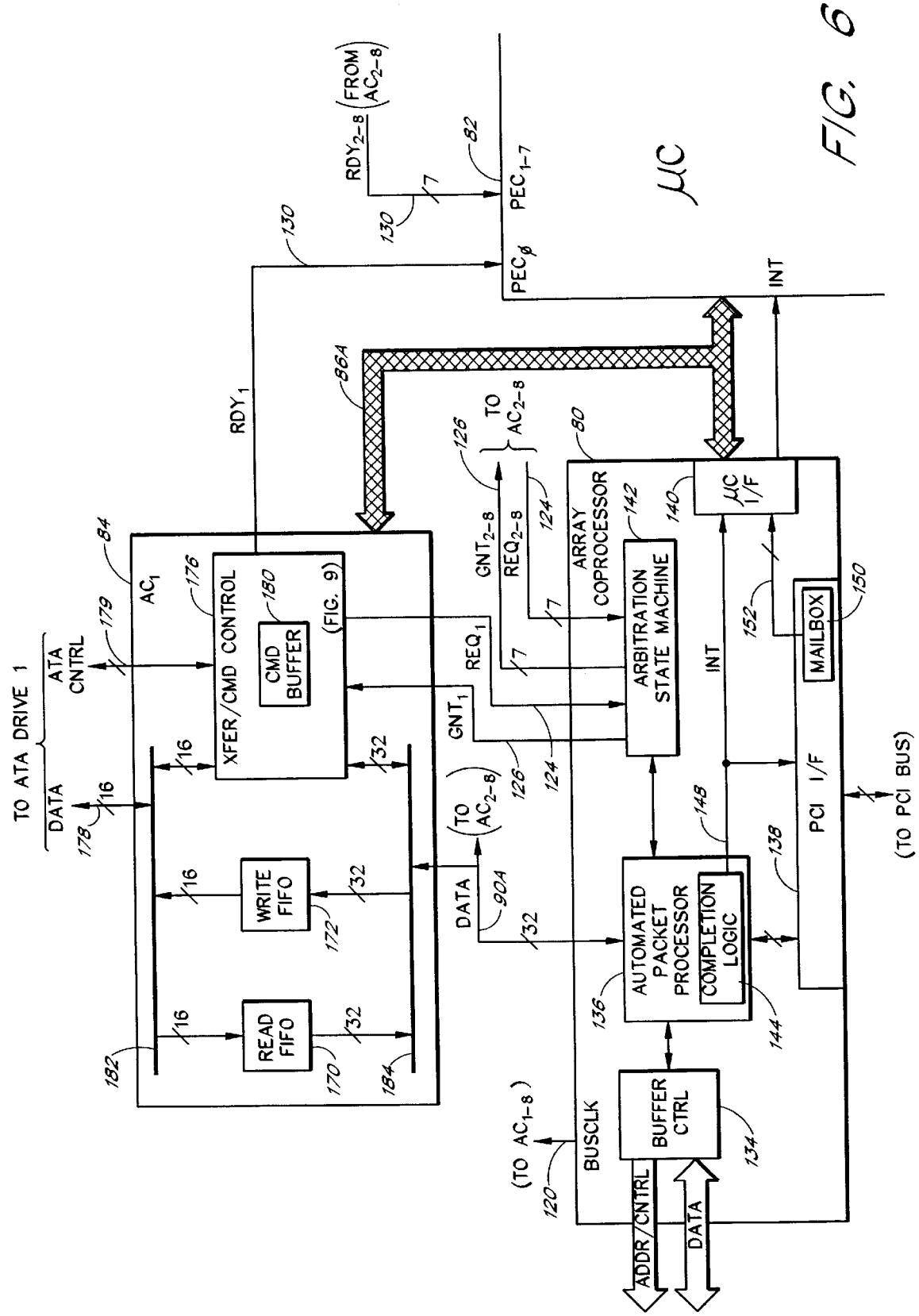
FIG. 6 illustrates the architecture of the system in further detail.

As illustrated by FIG. 6, the signal lines that interconnect the array coprocessor 80 to the automated controllers 84 to form the packet-switched bus 90 (FIG. 2) include a bus clock (BUSCLK) signal line 120, a 32-bit packet bus 90A, and a series of drive-specific request (REQ) and grant (GNT) lines 124, 126. The bus clock line 120 connects to all of the automated controllers 84, and carries a clock signal that controls all packet transfers on the packet-switched bus. In the preferred embodiment, the bus clock is a 33 MHz signal, and transfers of packet data occur at a rate of 32 bits (one doubleword) per clock cycle. In other embodiments, a faster bus clock speed may be used to accommodate faster and/or greater numbers of disk drives.

The 32-bit packet bus 90A carries all packet data that is transferred over the packet-switched bus. All packet transfers on this 32-bit bus 90A occur between the array coprocessor 80 and one of the automated controllers 84, with address and control information flowing in one direction (from the automated controllers 84 to the array coprocessor 80) and with I/O data flowing in both directions.

Each automated controller 84 is connected to the array coprocessor 80 by a respective request line 124 (labeled $REQ_1$–$REQ_8$ in FIG. 6) and a respective grant line 126 (labeled $GNT_1$–$GNT_8$). These signal lines carry signals that are used to implement the round robin arbitration protocol. More specifically, the request lines 124 are used by the respective automated controllers 84 to request timeslots on the packet-switched bus 90, and the grant lines 126 are used to grant the bus to the individual automated controllers 84. The grant lines 126 are also used by the array coprocessor 80 to control the framing of packets on the packet-switched bus. A preferred implementation of the arbitration protocol is discussed separately below with reference to FIG. 7.

As further illustrated by FIG. 6, each automated controller 84 connects to the microcontroller 82 by a respective ready signal line 130 (labeled $RDY_1$–$RDY_8$). Each ready line 130 carries a ready signal that is used by the respective automated controller 84 to request new controller commands from the microcontroller 82. As described below, the automated controllers 84 double the buffer controller commands, so that the next controller command (if available) will be queued-up within the automated controller 84 when the current controller command is completed. As depicted in FIG. 6, each ready signal line 130 connects to a respective PEC (peripheral event controller) input of the Siemens 163 microcontroller 82. The use of PECs provides a mechanism for rapidly and efficiently dispatching the controller commands from the command queues 108 (FIG. 3) to the automated controllers 84.

The remaining signal lines (data, etc.) of the local control bus are collectively denoted by reference number 86A in FIG. 6.

IV. Architecture and General Operation of Array Coprocessor

With further reference to FIG. 6, the array coprocessor 80 includes a buffer control circuit 134, an automated packet processor 136, a PCI interface (I/F) 138, a microcontroller interface 140, and an arbitration state machine 142. The buffer control circuit 120 includes logic for writing to and reading from the buffer 94 (FIG. 2). The buffer control circuit 120 also includes parity generation logic and logic for performing exclusive-OR operations on I/O data.

The automated packet processor 136 includes logic for parsing and processing packets received from the automated controllers 84, including routing logic for routing I/O data between the automated controllers on one hand and, the buffer 94 and system memory 40 (FIG. 2) on the other. The packets are processed by the automated packet processor 136 according to the transfer commands set forth in Table 1 above. A FIFO memory (not shown) is included within the automated packet processor 136 to temporarily buffer the I/O data that is being transferred.

In general, each packet received by the automated packet processor 136 is a self-contained entity which fully specifies an operation (including any target address) to be performed by the array coprocessor 80. For example, when a packet containing a WRITE PCI transfer command is received, the array coprocessor simply writes the payload data to the target PCI address specified within the packet, without regard to either the source (disk drive) of the payload data or the I/O request to which the data corresponds. In this respect, the array coprocessor 80 acts essentially as a stateless server—executing transfer commands from the automated controllers 84 (the "clients") without the need to know the details of the underlying I/O requests. An important benefit of this feature is that the logic circuitry of the array coprocessor 80 is significantly less complex than would be possible if, for example, the array coprocessor had to "match up" each incoming packet to its corresponding I/O request.

The automated packet processor 136 also includes a completion logic circuit 144 for processing completion packets to detect the end of an I/O request. As illustrated in FIG. 6, the completion logic circuit 144 generates and internal interrupt (INT) signal 148 to the PCI and microcontroller interfaces 138, 140 when the last completion packet of an I/O request is received. Assertion of this interrupt signal causes the microcontroller interface 140 to interrupt the microcontroller 82, and causes the PCI interface to set the interrupt flag (not shown) to the host processor 38. The completion logic circuit 144 is described in further detail below under the heading MONITORING OF I/O REQUEST COMPLETION.

The PCI interface 138 includes the basic logic needed to act as a PCI initiator on the host PCI bus 42. Whenever the automated packet processor 136 receives a packet that includes data to be written to system memory 40, the PCI interface 138 asserts a PCI request line (not shown) to request control of the host PCI bus to complete the transfer.

As shown in FIG. 6, the PCI interface also includes a mailbox storage area 150 ("mailbox") which can be written to by the host processor 38 (FIG. 2). In operation, the device driver 100 writes I/O requests and tokens to the mailbox 150 to initiate I/O processing. As depicted by the path 152 from the mailbox 150 to microcontroller interface 140, I/O requests written to the mailbox are passed to the microcontroller 82 for processing.

The microcontroller interface 140 includes circuitry for communicating with the microcontroller 82. The circuitry included in this interface 140 is generally dictated by the particular microcontroller that is used, which, in the preferred embodiment, is the Siemens 163. As depicted in FIG. 6, the microcontroller interface 140 drives an interrupt signal to the microcontroller 82 to enable the array coprocessor 80 to interrupt the microcontroller.

The arbitration state machine 142 implements the control side of the round robin arbitration protocol, and controls all accesses to the packet-switched bus. In a preferred embodiment, the arbitration state machine 142 samples the request (REQ) lines 124 in a round robin fashion (i.e., in sequential order), and whenever a request line is sampled as active, grants the packet-switched bus to the corresponding automated controller 84 (by asserting the corresponding grant line) for a time period sufficient for the transfer of a single packet. The arbitration protocol is described in detail below under the heading ARBITRATION PROTOCOL AND TIMING FOR PACKET TRANSFERS.

V. Architecture and General Operation of Automated Controllers

With further reference to FIG. 6, each automated controller 84 includes a read FIFO 170, a write FIFO 172, and a transfer/command control circuit 176. The signal lines which connect the automated controller to its corresponding ATA drive include a 16-line data bus 178 and a set of ATA control lines 179, all of which form part of a standard ATA cable. Each of the units 170, 172, 176 is connected to an internal 16-bit data bus 182 for communicating with an ATA drive, and an internal 32-bit bus 184 for communicating with the array coprocessor 80. As illustrated in FIG. 6, the transfer/command control 176 circuit includes a command buffer 180 for storing controller commands that have been received from the microcontroller 82.

The read FIFO 170 is used to temporarily store I/O data that is being transferred from the disk drive 72 to the array coprocessor 80. As depicted in FIG. 6, data is written into the read FIFO 170 one word (16 bits) at-a-time, and is read-out onto the data bus 90A one doubleword at-a-time. In the preferred embodiment, the read FIFO 170 holds 16 doublewords of data, which is the equivalent of two packet payloads.

In operation, data is written into the read FIFO at the disk drive's burst rate, which is 16.6 Mbytes/second for ATA mode 4 (EIDE) drives and 33.3 Mbytes/second for Ultra ATA drives. (The sustained transfer rates for these drives are typically significantly less because of seek times.) Data is read from read FIFO 170 (during allocated timeslots) and output onto the data bus 90A at the 33 MHz×4 bytes/cycle= 132 Mbytes/sec transfer rate of the packet-switched bus. The read FIFO thus acts as a data accelerator, storing I/O data from the disk-drive at one speed, and transmitting the data onto the data bus 90A in time-compressed bursts at a much faster data rate.

The write FIFO 172 is used to temporarily store I/O data that is being transferred from the array coprocessor 80 to the disk drive 72. As depicted in FIG. 6, data is written into the write FIFO 172 one doublebword at-a-time (at the 132 Mbytes/sec transfer rate of the packet-switched bus), and is transferred to the disk drive one word at-a-time (at the disk drive's burst rate). The write FIFO thus acts as a data decelerator, accepting I/O data in relatively high-transfer-rate bursts, and transferring the I/O data to the disk drive over longer time intervals at a relatively slow transfer rate. As with the read FIFO 170, the write FIFO holds 16 doublewords (two packets) of I/O data.

The transfer/command control 176 circuit includes logic for performing the following tasks: (i) pre-fetching controller commands from the microcontroller 82 into the command buffer 180, so that the command buffer contains the next controller command (if available) when processing of the current controller command is completed, (ii) processing controller commands received from the microcontroller 82 to generate transfer commands to pass to the disk drive 72, (iii) implementing the "host" side of the ATA protocol to communicate with the ATA drive 72, (iv) generating the headers (address and command fields) of packets to be transmitted on the packet-switched bus 90, and gating the header data onto the data bus 90A; (v) controlling the flow of data into and out of the read and write FIFOs 170 and 172, and (vi) generating request (REQ) signals and monitoring grant (GNT) signals to implement the "client" side of the arbitration protocol. The logic circuitry used to implement these functions is discussed below under the heading TRANSFER/COMMAND CONTROL CIRCUIT.

In operation, the transfer/command control circuit 176 asserts the RDY line 130 to the microcontroller 82 whenever the command buffer 180 is empty. Assertion of the RDY line 130 causes the microcontroller 82 to issue the next controller command to the automated controller 84 from the corresponding queue 108 (FIG. 3). If no controller command is currently in the queue, the microcontroller issues the controller command when it becomes available (such as when a new I/O request is received from the host computer 34). When the microcontroller 82 issues a controller command to the automated controller 84, the transfer/command control circuit 176 stores the command block portion (FIG. 4) of the controller command in the command buffer 180 and deasserts the RDY line 130.

Figure 9:
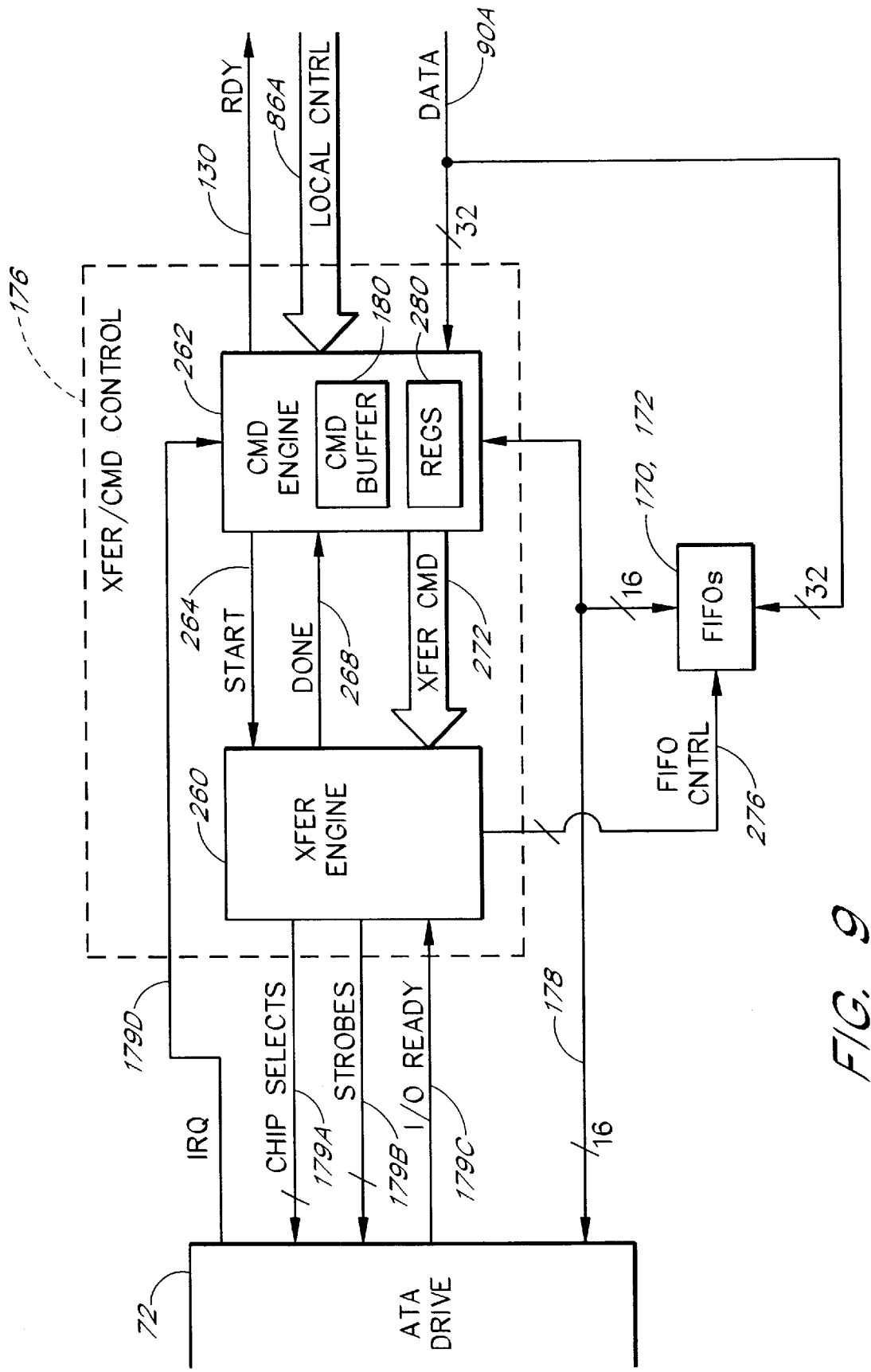
FIG. 9 illustrates the transfer/command control circuit of FIG. 6 in further detail.

When the ATA drive becomes ready, the transfer/command control circuit 176 writes the command block to the drive for processing. The command block includes the various parameters (cylinder, head, etc.) which specify a disk transfer operation ("disk operation"). If the controller command calls for a write of I/O data to the disk, the transfer/command control circuit 176 also generates and transmits appropriate packets (with READ BUFFER and/or READ PCI commands) to begin filling the write FIFO 172 with I/O data. Once the command block is written to the disk drive 72, the command buffer 180 becomes empty, and the transfer/command control circuit 176 reassert the RDY line 130 to request a new controller command. As discussed below, the target address and other information needed to complete the transfer over the packet-switched bus is maintained in separate registers 280 (FIG. 9).

In typical ATA implementations, a period of disk inactivity or "dead period" occurs while the ATA drive fetches the next disk command from the host computer. This dead period adversely affects the net throughput of the disk drive. In the preferred embodiment, the architecture of the control program is such that the next controller command (if available) will be written to the command buffer 180 before the disk drive 72 finishes processing the current disk operation. Thus, the latency that would normally be associated with having to fetch a new controller command from the microcontroller 82 is avoided. This feature of the architecture enables a high degree of performance to be achieved using low-cost ATA drives.

During the processing of the disk operation, the transfer/command control circuit 176 repeatedly asserts its request (REQ) line 124 to the array coprocessor 80 to request timeslots on the packet-switched bus 90. For example, if the disk operation is a sector read, the transfer/command control circuit 176 will assert the request line 124 sixteen times to transfer sixteen packets, each containing eight doublewords of I/O data. As the sequence of packets is transferred, the transfer/command control circuit 176 increments an internal counter (not shown) to reflect the number of bytes that have been transferred, and uses the counter value to generate appropriate target addresses to insert within the headers (FIG. 5) of the packets.

The transfer/command control circuit 176 determines whether to assert the request line 124 either by monitoring the state of the read FIFO 170 (if the disk operation is a disk read) or by monitoring the state of the write FIFO 172 (if the disk operation is a disk write). Specifically, for disk read operations, the transfer/command control circuit 176 asserts the request line 124 whenever the read FIFO 170 contains at least one packet (8 doublewords) of I/O data; and for disk write operations, the transfer/command control circuit 176 asserts the request line 124 whenever the write FIFO 172 has sufficient room to receive at least one packet of I/O data. (As indicated above, each of these FIFOs 170, 172 has a capacity that is equivalent to two packets of I/O data.) Thus, request signals are generated based on the availability of these two buffers.

Whenever the automated controller 84 asserts its request line 124, the automated controller will be granted a timeslot in which to perform a packet transfer within a fixed, maximum time period. (This feature of the bus design is a result of the round robin protocol, which is discussed below.) This maximum time period is approximately equal to the time needed for all seven of the other automated controllers 84 to transmit maximum-length packets. This maximum time period is preferably selected such that (i) on disk read operations, the read FIFO 170 will never become completely full, and (ii) on disk write operations of data stored in the buffer 94, the write FIFO 172 will never prematurely become empty. An important benefit of this feature is that the disk drive will not be required to suspend a disk read or disk write operation as the result insufficient bandwidth on the packet-switched bus. Thus, the packet-switched bus provides a virtual connection between the array coprocessor 80 and every automated controller 84.

VI. Arbitration Protocol and Timing for Packet Transfers

As illustrated in FIG. 6 and discussed above, the array coprocessor 80 includes an arbitration state machine 142 that grants control of the data bus 90A to the automated controllers 84 using a round robin protocol. The arbitration state machine grants control of the bus 90A based on the respective states of the request lines 124 from the automated controllers 84, and based on transfer status information received from the automated packet processor 136. The automated controllers 84 assert their respective request lines 124 asynchronously to one another, and multiple request lines can be asserted during the same cycle of the bus clock.

Figure 7:
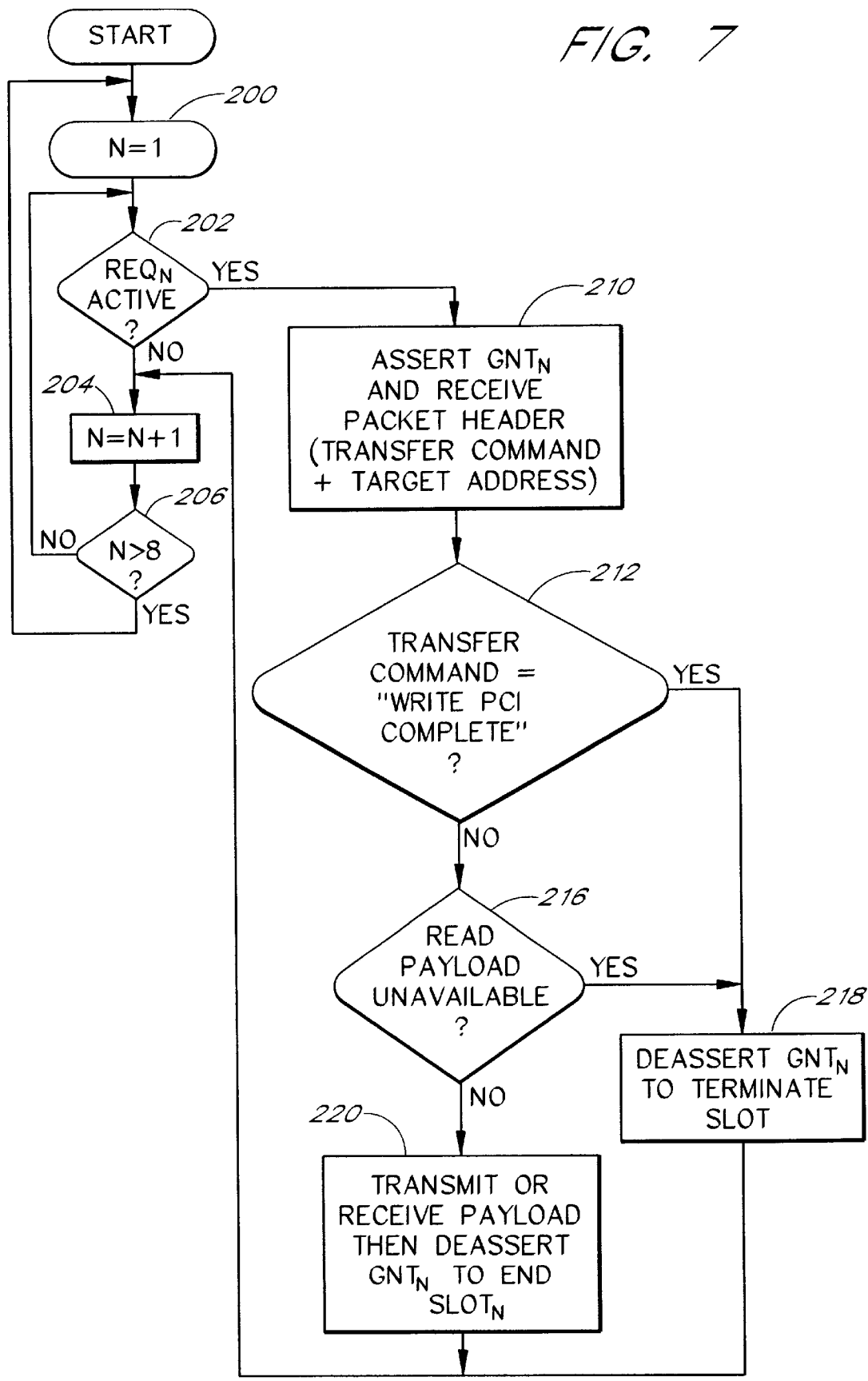
FIG. 7 is a flow diagram which illustrates a round robin arbitration protocol which is used to control access to the packet-switched bus of FIG. 2.

FIG. 7 is a flow diagram which illustrates the basic arbitration protocol implemented by the arbitration state machine 142. The variable "N" in the flow diagram is a disk drive reference number which varies between 1 and 8. As illustrated by blocks 200–206 of the diagram, when none of the eight request (REQ) lines are active, the state machine 142 remains in a loop in which it samples the requests lines in sequence. In one implementation, the state machine 142 uses one clock cycle of the bus clock 120 to sample an inactive request line 124 and move on to the next request line. Thus, when none of the request lines 124 are active, the state machine 142 samples all eight request lines in eight clock cycles. In other implementations, the state machine 142 may be configured to sample multiple request lines 124 per clock cycle.

As illustrated by blocks 202 and 210, when a request line 124 is sampled as active, the state machine 142 immediately (i.e., on the same clock cycle) asserts the corresponding grant line 126 to grant the bus to the requesting automated controller 84. On the same clock cycle, the array coprocessor 80 receives the transfer command (FIG. 5) from the automated controller 84; and on the following clock cycle, the array coprocessor 80 receives the target address from the automated controller 84.

As depicted by blocks 212 and 218, the state machine 142 then communicates with the automated packet processor 136 (FIG. 6) to determine whether or not the packet will include a payload. No payload is transmitted either if (i) the transfer command is WRITE PCI COMPLETE (block 212), or (ii) the transfer command is READ BUFFER and the target data is not yet available in the buffer 94 (block 216). In either of these two cases, the state machine 142 deasserts the grant line 126 (block 216) to terminate the timeslot, and returns to the sampling loop.

As represented by block 220, if neither of the above conditions is met, the state machine 142 continues to assert the grant line 126 while the payload is transmitted or received. As discussed above, the payload is transferred over the data bus 90A (FIG. 6) at a rate of one doubleword per clock cycle. If the payload is transferred from the array coprocessor 80 to an automated controller 84, an extra clock cycle is used as a "dead period" between the header transmission by the automated controller 84 and the payload transmission by the array coprocessor 80.

An important aspect of this arbitration protocol is that when a disk drive does not use its timeslot, the timeslot is effectively relinquished for other drives to use. Thus, in addition to guaranteeing that 1/N of the bus's total bandwidth will be available to every drive at all times (i.e., during every round robin cycle), the protocol enables the drives to use more than 1/N of the total bandwidth when one or more drives are idle. A drive may be able to use this additional bandwidth, for example, if a cache hit occurs on a disk read, allowing the drive to return the requested data at a rate which is considerably higher than the drive's sustained transfer rate.

Although the system of the preferred embodiment uses drive-specific request and grant lines 124, 126 to implement the round robin protocol, a variety of alternative techniques are possible. For example, the array coprocessor 80 could transmit periodic synchronization pulses on a shared control line to synchronize the automated controllers 84, and each automated controller could be preprogrammed via the control program to use of a different timeslot of a frame; the automated controllers could then use internal counters to determine when their respective timeslots begin and end.

It will also be recognized that although the preferred embodiment uses a round robin arbitration protocol, other protocols can be used to achieve a similar effect. For example, the arbitration state machine could be designed to implement a protocol in which the bus is granted to the automated controller 84 that least-recently accessed the packet-switched bus 90.

VII. Monitoring of I/O Request Completion

FIG. 8 illustrates the completion logic circuit 144 of the array coprocessor 80, and illustrates the general flow of information that takes place whenever a completion packet is received. As described above, the purpose of the circuit 144 is to monitor the tokens and disk completion values contained within completion packets to detect the completion of processing of an I/O request. When the circuit 144 detects that an I/O request has been completed, the circuit asserts the internal interrupt line 148, which causes the array coprocessor 80 to interrupt the microcontroller 82 and set the interrupt flag to the host processor 38.

As depicted in FIG. 8, the circuit 144 includes a register file 240, an 8-bit logical OR circuit 242, and an 8-bit compare circuit 244. The register file 240 includes sixteen 8-bit registers 248 (labeled 0–F). Each register 248 corresponds to a respective 4-bit token and holds the result of the cumulative OR operation for the corresponding I/O request. As described above, the tokens are assigned to pending I/O requests by the device driver as the I/O requests are passed to the array controller 70. At any given time, each assigned token corresponds uniquely to a different pending I/O request. Thus, in the implementation depicted in FIG. 8, up to sixteen I/O requests can be pending simultaneously.

Disk completion values are generated by the control program (such as by using a lookup table), and are assigned such that the cumulative OR of all of the completion values assigned to a given I/O request equals FFH. For example, for an I/O request that only requires access to one drive, a single disk completion value of FF will be assigned to the disk drive; and for an I/O request that involves all eight disk drives 72, each drive will be assigned a disk completion value having a different respective bit set (i.e., 00000001, 00000010, 00000100, 00001000, 00010000, 00100000, 01000000, and 10000000).

In operation, whenever a completion packet is received, the token and the disk completion value are extracted from the packet and passed as inputs to the completion logic circuit 144. As depicted in FIG. 8, the token is used to address the register file 144, causing the corresponding cumulative OR value (which will be 0 on the first pass) to be read from the register file and fed as an input to the OR circuit 242. The cumulative OR value is then ORed with the disk completion value to generate a new completion value. The new completion value is written back to the same location 248 in the register file 240, and is also compared by the compare circuit 244 with the final completion value of FFH. If a match occurs (indicating that the last completion packet has been received), the compare circuit 244 asserts the INT line 148, and also asserts a reset signal (not shown) which causes the addressed location in the register file 240 to be reset.

As indicated above, an important benefit of this method is that it enables the array coprocessor to 80 to detect the completion of an I/O request without any prior information about the I/O request (such as the number of drives involved or the type of transfer). Another benefit is that it enables the completion of the I/O request to be rapidly posted to the host computer 34, regardless of the order in which the disk drives finish processing their component portions of the I/O request.

VIII. Transfer/Command Control Circuit

FIG. 9 illustrates the transfer/command control circuit 176 of FIG. 6 in greater detail, and illustrates the primary signal connections of the transfer/command control circuit 176 to other components of the system. To simplify the drawing, the read and write FIFOs 170, 172 are shown as a single entity, and the logic for generating request (REQ) signals and monitoring grant (GNT) signals has been omitted.

As illustrated in FIG. 9, the transfer/command control circuit 176 includes a transfer engine 260 and a command engine 262 that are connected by a START line 264, a DONE line 268, and a transfer command bus 272. The transfer and command engines 260, 262 include state machines and other logic which collectively implement the "host" side of the ATA protocol (including Ultra ATA). In typical ATA implementations, the host side of the ATA protocol is implemented through firmware. By automating the host side of the protocol (i.e., implementing the host side purely within hardware), a high degree of performance is achieved without the need for complex firmware.

The transfer engine 260 interfaces with the ATA drive 72 via a set of standard ATA signal lines, including chip selects 179A, strobes 179B, and an I/O ready line 179C. The transfer engine 260 also includes a set of FIFO control lines 276 that are used to control the flow of data into and out of the read and write FIFOs 170, 172.

The command engine 262 connects to the microcontroller 82 via the ready (RDY) line 130 and the local control bus 86A, and connects to the array coprocessor 80 via the 32-bit data path 90A of the packet-switched bus. The command engine 262 connects to the ATA drive 72 via the 16-bit ATA data bus 178 and the ATA drive's interrupt request (IRQ) line 179D. Included within the command engine 262 are the command buffer 180 and a set of registers 280. As discussed below, the registers 280 are used to hold information (target addresses, etc.) associated with the controller commands.

The transfer engine 260 supports three types of disk transfer operations: a 1-cycle STATUS READ, an 8-cycle COMMAND WRITE, and a 256-cycle DATA TRANSFER. These operations are initiated by the command engine by asserting the START signal line 264 and driving the transfer command bus 272 with a command code. When a STATUS READ is performed, the transfer engine 260 reads the ATA drive's status register (not shown), and routes the status information to the command engine 262. When a COMMAND WRITE is performed, the transfer engine 260 gates the contents of the command buffer 180 onto the drive's data bus 178 to copy a command block (FIG. 4) to the drive. When a DATA TRANSFER is performed, the transfer engine 260 transfers one sector of I/O data between the drive and either the read FIFO 170 or the write FIFO 172.

With further reference to FIG. 9, the transfer/command control circuit 176 processes controller commands generally as follows. Whenever the command buffer 180 is empty, the command engine 262 asserts the RDY line 130 to request a new controller command from the microcontroller 82. When the microcontroller 82 returns a controller command, the command engine 262 deasserts the RDY line 130 and parses the controller command. The command block (FIG. 4) is written to the command buffer 180, and the remaining portions of the controller command (target address, transfer information, and any completion information) are written to the registers 280.

At this point, the command engine 262 waits until processing of any ongoing disk operation is complete. Once processing is complete, the command engine implements the sequence shown in FIG. 10 (discussed below) to control the operation of the disk drive 72. In addition, if the controller command calls for data to be written to the disk drive 72 and the write FIFO 170 is available, the command engine 262 begins to generate and send packets on the packet-switched bus to initiate the filling of the write FIFO 172.

Figure 10:
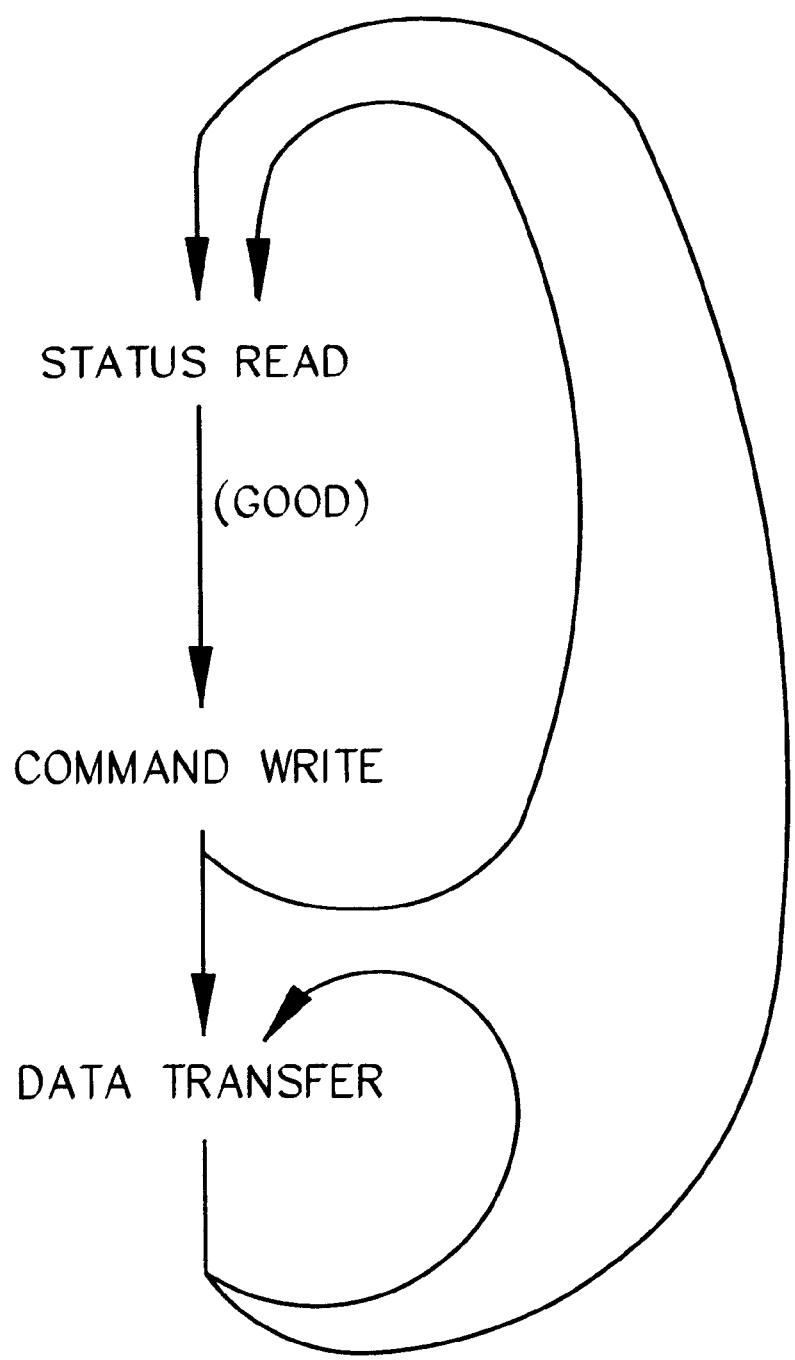
FIG. 10 illustrates the operation of the command engine of FIG. 9.

FIG. 10 illustrates the sequence of transfer operations that are initiated by the command engine 262. The command engine initially requests a STATUS READ operation to check the status of the drive. If the result of the STATUS READ indicates that firmware intervention will be required (not shown in FIG. 10), the command engine 262 reports the error to the microcontroller 82, and the microcontroller enters into an appropriate service routine. If no errors are reported, the command engine 262 initiates a COMMAND WRITE operation to transfer the command block from the command buffer 180 to the ATA drive 72. This causes the command buffer to become empty, which in-turn causes the command engine 262 to reassert the RDY line 130. The command block may specify a transfer of zero sectors, one sector, or multiple sectors.

After the drive 72 returns from the COMMAND WRITE operation (by asserting the IRQ line 179D), the command engine 262 either (i) initiates a new STATUS READ operation (if no data transfer is required) to begin processing of the next controller command, or (ii) initiates a 256-cycle DATA TRANSFER operation to transfer one sector of data between the disk drive and one of the FIFOs 170, 172. When a DATA TRANSFER operation is completed, the command engine 262 either returns to the STATUS READ state, or, if additional sector transfers are needed, initiates one or more additional DATA TRANSFER operations.

One benefit to using automated ATA controllers (as opposed to firmware) is that on read operations, the data can be retrieved from the drive as soon as it is available. In addition to reducing latency, this aspect of the design enables ATA drives with smaller buffers to be used without the usual loss in performance.

Although this invention has been described in terms of certain preferred embodiments, other embodiments that are apparent to those or ordinary skill in the art are also within the scope of this invention. Accordingly, the scope of the present invention is intended to be defined only by reference to the appended claims.

In the claims which follow, reference characters used to designate claim steps are provided for convenience of description only, and are not intended to imply any particular order for performing the steps.

What is claimed is:

1. A disk array system, comprising:
   a plurality of controllers, each controller automating a host side of an ATA protocol, without fetching and executing sequences of macro-instructions, to control a respective disk drive of a plurality of disk drives;
   a processor that processes input/output data written to and read from the disk drives; and
   a bus that interconnects, and carries input/output data between, the processor and each of the plurality of controllers.

2. The disk array system as in claim 1, wherein the bus is a packet-switched bus that transfers input/output data to and from the controllers in packets.

3. The disk array system as in claim 1, wherein the bus implements a round robin bus arbitration protocol to grant control thereof to individual controllers of the plurality of controllers.

4. The disk array system as in claim 1, wherein the bus implements a least-recently-used bus arbitration protocol to grant control thereof to individual controllers of the plurality of controllers.

5. The disk array system as in claim 1, wherein the bus guarantees a selected minimum input/output bandwidth to each of the plurality of controllers.

6. The disk array system as in claim 1, wherein each of the plurality of controllers implements a host side of at least an ultra ATA protocol within automated circuitry.

7. The disk array system as in claim 1, wherein each controller comprises an automated transfer engine circuit that implements at least the following types of disk drive transfer operations: a status read operation, a command write operation, and a data transfer operation.

8. The disk array system as in claim 1, wherein each controller includes a FIFO (first-in-first-out) buffer circuit that receives and stores input/output data from a respective disk drive at a first transfer rate, and transmits buffered input/output data on the bus at a second transfer rate that is greater than the first transfer rate, the FIFO buffer circuit thereby accommodating a difference in transfer rates between the disk drive and the bus.

9. The disk array system as in claim 1, further comprising a microcontroller which dispatches disk drive commands to each of the plurality of controllers over a control bus, the control bus being separate from the bus that carries the input/output data.

10. The disk array system as in claim 9, wherein the microcontroller is programmed to implement at least one RAID configuration.

11. The disk array system as in claim 1, wherein each controller comprises a respective command buffer that stores disk drive commands to be executed by a corresponding ATA disk drive such that a new disk drive command may be dispatched to the ATA disk drive substantially immediately following execution by the ATA disk drive of a current disk drive command.

12. The disk array system as in claim 1, wherein the processor includes an automated circuit that uses tokens received from the controllers to monitor completion statuses of input/output requests.

13. The disk array system as in claim 1, further comprising said plurality of disk drives.

14. An input/output (I/O) subsystem, comprising:
   an ATA (AT Attachment) disk drive; and
   a controller external to the ATA disk drive and connected to the ATA disk drive by a set of signal lines;
   wherein the controller implements a host side of an ATA protocol within automated circuitry, without fetching and executing sequences of macro-instructions, to control the ATA disk drive over the set of signal lines.

15. The I/O subsystem as in claim 14, wherein the automated circuitry comprises a transfer engine circuit that implements at least the following types of disk drive transfer operations: a status read operation, a command write operation, and a data transfer operation.

16. The I/O subsystem as in claim 14, wherein the controller comprises a data buffer that stores I/O data during transfers to and from the ATA disk drive.

17. The I/O subsystem as in claim 16, wherein the controller transfers data between the data buffer and a packet-switched bus to which an array of disk drives are coupled.

18. The I/O subsystem as in claim 14, wherein the controller includes a FIFO (first-in-first-out) buffer circuit that receives and stores I/O data from the ATA disk drive at a first transfer rate, and transmits buffered I/O data on a bus at a second transfer rate that is greater than the first transfer rate, the FIFO buffer circuit thereby accommodating a difference in transfer rates between the ATA disk drive and the bus.

19. The I/O subsystem as in claim 14, wherein the controller comprises a command buffer that stores disk drive commands to be executed by the ATA disk drive such that a new disk drive command may be dispatched to the ATA disk drive substantially immediately following execution by the ATA disk drive of a current disk drive command.

20. The I/O subsystem as in claim 19, wherein the controller receives the disk drive commands over a control bus which is separate from a bus over which I/O data is transferred.

21. The I/O subsystem as in claim 19, wherein the controller prefetches and buffers a new disk drive command while the ATA disk drive is processing a current disk drive command.

22. The I/O subsystem as in claim 14, wherein the controller implements at least a standard Ultra ATA protocol within the automated circuitry.

23. The I/O subsystem as in claim 14, wherein the controller is connected to, and arbitrates for control of, a bus of a disk array controller.

24. The I/O subsystem as in claim 14, wherein the controller transmits I/O data read from the ATA disk drive on an arbitrated bus in packets, wherein at least some of the packets include target system memory addresses for transferring the I/O data to a system memory.

25. The I/O subsystem as in claim 14, wherein the set of signal lines comprises a set of standard ATA signal lines.

26. The I/O subsystem as in claim 14, further comprising a microcontroller connected to the controller by a control bus, said microcontroller programmed to implement at least one RAID configuration to control an array of ATA disk drives.

27. The I/O subsystem as in claim 14, wherein the controller is embodied within a single integrated circuit device.

28. The I/O subsystem as in claim 27, wherein the integrated circuit device is an application specific integrated circuit (ASIC) device.

29. The I/O subsystem as in claim 27, wherein the integrated circuit device is an FPGA device.

30. The I/O subsystem as in claim 27, wherein the integrated circuit device comprises a second controller that controls a second ATA disk drive.

* * * * *